United States Patent [19]

van der Steen

[11] 4,032,315

[45] June 28, 1977

[54] METHOD FOR THE PRODUCTION OF QUARTZ-GLASS OBJECTS BY DRAWING

[75] Inventor: Gerardus Henricus Antonius Maria van der Steen, Eindhoven, Netherlands

[73] Assignee: U.S. Philips Corporation, New York, N.Y.

[22] Filed: Nov. 10, 1975

[21] Appl. No.: 630,535

[30] Foreign Application Priority Data

Nov. 18, 1974 Netherlands ............... 7414978

[52] U.S. Cl. .................. 65/32; 65/134; 65/136
[51] Int. Cl.² ........................ C03B 5/16
[58] Field of Search ............ 65/32, 134, 136

[56] References Cited

UNITED STATES PATENTS

| 3,459,522 | 8/1969 | Elmer et al. | 65/32 X |
| 3,717,450 | 2/1973 | Loughridge et al. | 65/32 X |
| 3,764,286 | 10/1973 | Antczak et al. | 65/134 |
| 3,775,077 | 11/1973 | Nicastro et al. | 65/32 X |

Primary Examiner—Robert L. Lindsay, Jr.
Attorney, Agent, or Firm—Frank R. Trifari; Robert S. Smith

[57] ABSTRACT

A method for producing quartz glass objects starting from a melt of silicon dioxide in helium and hydrogen atmosphere. The drawn objects are first heated in the temperature range of 800°–1400° C and thereafter at a temperature of at least 1600° C. The result is a considerable reduction in the number of bubbles.

1 Claim, No Drawings

METHOD FOR THE PRODUCTION OF QUARTZ-GLASS OBJECTS BY DRAWING

The invention relates to a method for producing quartz glass objects by drawing from a melt.

From the Swiss Patent Specification 540,859 a method for the continuous production of elongated objects of molten quartz is known according to which starting material consisting of silicon dioxide is continuously fed in particle form at a predetermined rate into the upper part of a heated furnace, the starting material being continuously melted in the upper, heated zone of the furnace in a gas atmosphere of hydrogen and helium in a ratio by volume of 40–65% of hydrogen to 60–35% of helium and at a melting temperature which is 2050° C or higher, heating of the molten material is continued in the lower zone of the furnace by means of a separate heating device while a temperature is maintained which is below 2050° C in the molten material and the molten material is continuously drawn from the lower zone of the furnace by means of a forming device in the presence of an atmosphere containing hydrogen in a non-oxidizing carrier gas.

The effect of this method is that a quartz glass is obtained having a considerable smaller number of trapped gas bubbles than quartz glass which was produced according to older methods. Trapped gas bubbles cause channels in the drawing direction in the drawn product, owing to which the quartz glass is less suitable for application as envelopes, for example of lamps which must satisfy optical requirements. The process described above is carried out in an atmosphere consisting of gasses which easily diffuse through the molten quartz glass and which can dissolve properly in it. Therefore the product obtained contains considerably fewer trapped gas bubbles and furthermore is extremely stable dimensionally.

It was an object of the invention also to eliminate the remaining gas bubbles from the quartz glass and so to obtain a quartz glass which is completely free of bubbles. The occurrence of these gas bubbles is described to the separation of dissolved gases at the melting temperature due to cooling during the drawing process.

It was now found according to the invention that, when the product drawn in an atmosphere of an easily diffusing gas is cooled and then heated in vacuo or in air at a temperature of between 800 and 1400° C for a time which arises from a few days (800°C) to a few minutes (1400° C) depending on the temperature chosen and is thereafter heated to into the softening range, the ramaining gas bubbles diffuse out at the first heating, leaving vacuum bubbles behind which are compressed at the higher temperature and in this way yield an irreproachable quality of the product. The product is completely satisfactory when high requirements are made on the optical qualities.

The duration for which the products must be heated in the softening range, i.e. a temperature of at least 1600° C, depends on how high the temperature is but in general does not amount to more than a few minutes. In general the temperature will not be allowed to increase to above 1900° C as otherwise deformation of the products becomes impermissible. However, in a technique in which a tubular product is drawn over a graphite arbor and calibrated, heating is carried out at a temperature of approximately 2000° C at which the quartz glass is in a molten condition.

What is claimed is:
1. A method for continuously producing elongated objects of quartz glass which comprises: feeding continuously starting material consisting of silicon dioxide in particle form at a predetermined rate into the upper part of a heated furnace, melting continuously the starting material in the upper, heated zone of the furnace in a gas atmosphere of hydrogen and helium in a ratio by volume of 40–65% of hydrogen to 60–35% of helium and at a melting temperature which is not below 2050° C, heating of the molten material thereafter in the lower zone of the furace by means of a separate heating means to maintain a temperature which is lower than the 2050° C in the molten material and drawing the molten material from the lower zone of the furnace by means of a forming device in the presence of an atmosphere which contains hydrogen in a non-oxidizing carrier gas cooling said material, heating said material to a temperature of between a plurality of days at 800° C and a plurality of minutes at 1400° C in a vacuum or in air and, thereafter heating at a temperature of at least 1600° C for a plurality of minutes.

* * * * *